(12) United States Patent
Chen

(10) Patent No.: US 8,771,156 B2
(45) Date of Patent: Jul. 8, 2014

(54) STRUCTURE TO FIX INFLATABLE AND ELASTIC MOTION BODY

(75) Inventor: Ming-Chin Chen, Changhua (TW)

(73) Assignee: Ever Gym Enterprises Co. Ltd., Changhua (TW)

(*) Notice: Subject to any disclaimer, the term of this patent is extended or adjusted under 35 U.S.C. 154(b) by 194 days.

(21) Appl. No.: 13/372,697

(22) Filed: Feb. 14, 2012

(65) Prior Publication Data

US 2013/0209165 A1   Aug. 15, 2013

(51) Int. Cl.
*A63B 26/00* (2006.01)

(52) U.S. Cl.
USPC ............ 482/142; 482/148; 403/338; 403/373

(58) Field of Classification Search
USPC .......... 403/335, 338, 373; 482/140, 124, 148, 482/142
See application file for complete search history.

(56) References Cited

U.S. PATENT DOCUMENTS

| | | | | | |
|---|---|---|---|---|---|
| 2,457,077 | A | * | 12/1948 | Woolsey | 285/340 |
| 4,146,258 | A | * | 3/1979 | Andruchiw | 403/338 |
| 4,351,390 | A | * | 9/1982 | Argyle et al. | 403/338 |
| 4,418,948 | A | * | 12/1983 | Lew et al. | 285/420 |
| 4,579,375 | A | * | 4/1986 | Fischer et al. | 403/338 |
| 6,461,285 | B1 | * | 10/2002 | Theunissen et al. | 482/146 |
| 6,554,753 | B1 | * | 4/2003 | Weck et al. | 482/147 |
| 6,719,676 | B1 | * | 4/2004 | Hsu | 482/146 |
| 7,661,730 | B2 | * | 2/2010 | Meinig | 285/365 |

* cited by examiner

*Primary Examiner* — Michael P Ferguson
(74) *Attorney, Agent, or Firm* — Che-Yang Chen; Law Office of Michael Chen

(57) ABSTRACT

An improved structure to fix an inflatable and elastic motion body includes an elastic air bag, a frame, a base and a plurality of restricting pieces. The base has a receiving slot recessedly formed close to a top surface of the base, and a recessed engaging trough recessedly formed close to a bottom surface thereof. The recessed engaging trough engages with a hook end of the restricting piece, so the restricting piece can tightly clamp a fixed edge of the elastic air bag. Since the restricting pieces with better strength are disposed in restricting slots of the frame to tightly confine the elastic air bag and the base to locate between the hook end and the pressing end of the restricting piece, so when the elastic air bag is heavily pressed, it would not escape from the restricting slot of the frame to increase the structural strength and durability.

3 Claims, 6 Drawing Sheets

STRUCTURE TO FIX INFLATABLE AND ELASTIC MOTION BODY

FIELD OF THE INVENTION

The present invention relates to an improved structure to fix an inflatable elastic motion body, and more particularly to restricting pieces with better strength disposed in the restricting slots of the frame to tightly clamp and confine the elastic air bag and the base to locate between the hook end and the pressing end of the restricting piece. So when the elastic air bag is heavily pressed, it would not escape from the restricting slot of the frame to increase the structural strength and durability.

BACKGROUND OF THE INVENTION

A conventional structure to fix an inflatable elastic motion body as shown in FIGS. 5 and 6 includes a main body (50), a base unit (60) and a ring frame (70). A fixing edge (51) is protrudingly formed at an edge of the bottom surface of the main body (50). A top surface of the base unit (60) is provided for the main body (50). The ring frame (70) is made by plastic materials and, a restricting slot (71) is recessely formed inside the ring frame (70) to fix and secure the fixing edge (51) of the main body (50) and the bottom surface of the base unit (60). The conventional structure is disadvantageous because (a) when the conventional inflatable elastic motion body is used, it bears great deal amount of pressure from a user, so the ring frame (70) made by plastic materials is easily to be bended or deformed, and the main body (50) cannot be securely fixed to the base unit (60); and (b) the base unit (60) are usually made by several boards connected with each other, but the structural strength is usually not strong enough, and it will adversely affect the durability of the entire structure for the inflatable elastic motion body. Therefore, there remains an improved and new structure to overcome the problems stated above.

SUMMARY OF THE INVENTION

The problems the present invention wants to solve are (a) when the conventional inflatable elastic motion body is used, it bears great deal amount of pressure from a user, so the ring frame made by plastic materials is easily to be bended or deformed, and the main body cannot be securely fixed to the base unit; and (b) the base unit are usually made by several boards connected with each other, but the structural strength is usually not strong enough, and it will adversely affect the durability of the entire structure for the inflatable elastic motion body.

To solve and overcome the problems stated above, the present invention provides an improved structure to fix an inflatable and elastic motion body includes an elastic air bag, a frame, a base and a plurality of restricting pieces. The elastic air bag is a semicircular ball-shaped body, and a fixed edge is protrudingly formed at a lower periphery of the elastic air bag, and a connecting edge extends downwards from the fixed edge. The frame is ring-shaped frame, and a restricting slot is recessedly formed at an inner portion thereof to provide a space for the fixed edge of the elastic air bag. The base includes a receiving slot recessedly formed close to a top surface of the base, and a recessed engaging trough is recessedly formed close to a bottom surface of the base. The restricting piece is made by metal materials with better strength, and is spacedly disposed at an edge of the base to evenly distribute the tension. A hook end is bending and extending from one end of the restricting piece, and the hook end engages in the recessed engaging trough of the base. A pressing end is bending and extending from the other end of the restricting piece to tightly clamp the fixed edge of the elastic air bag. Accordingly, an improved structure to fix an inflatable and elastic motion body is obtained.

Comparing with the conventional arts, the present invention provides an improved structure to fix an inflatable and elastic motion body having the restricting pieces with better strength are disposed in the restricting slots of the frame to tightly clamp and confine the elastic air bag and the base to locate between the hook end and the pressing end of the restricting piece, so when the elastic air bag is heavily pressed, it would not escape from the restricting slot of the frame to increase the structural strength and durability thereof. Furthermore, the restricting pieces of the improved structure are positioned corresponding to the gaps between each fan-shaped board, so the structural strength of the fan-shaped board and the base is enhanced.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
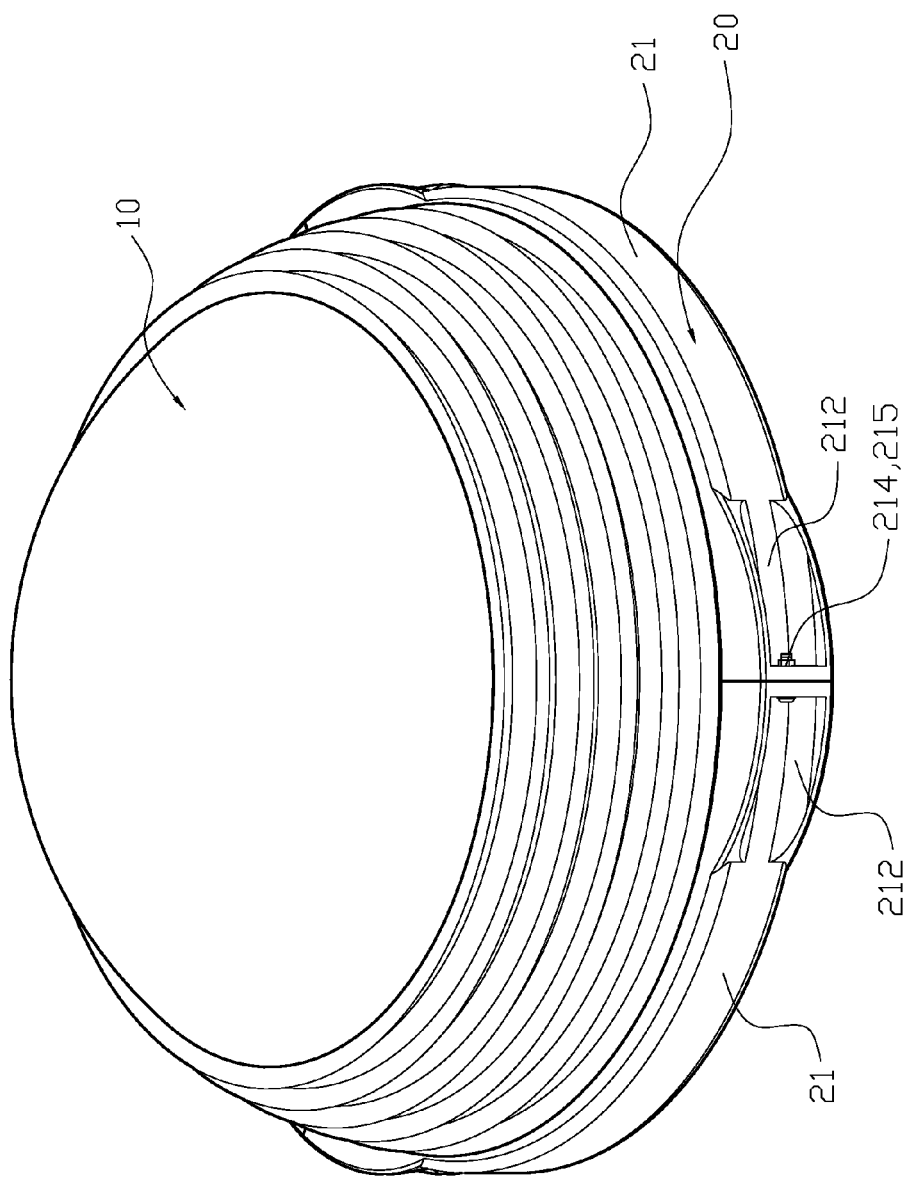
FIG. 1 illustrates a three-dimensional view in the present invention.
Figure 2:
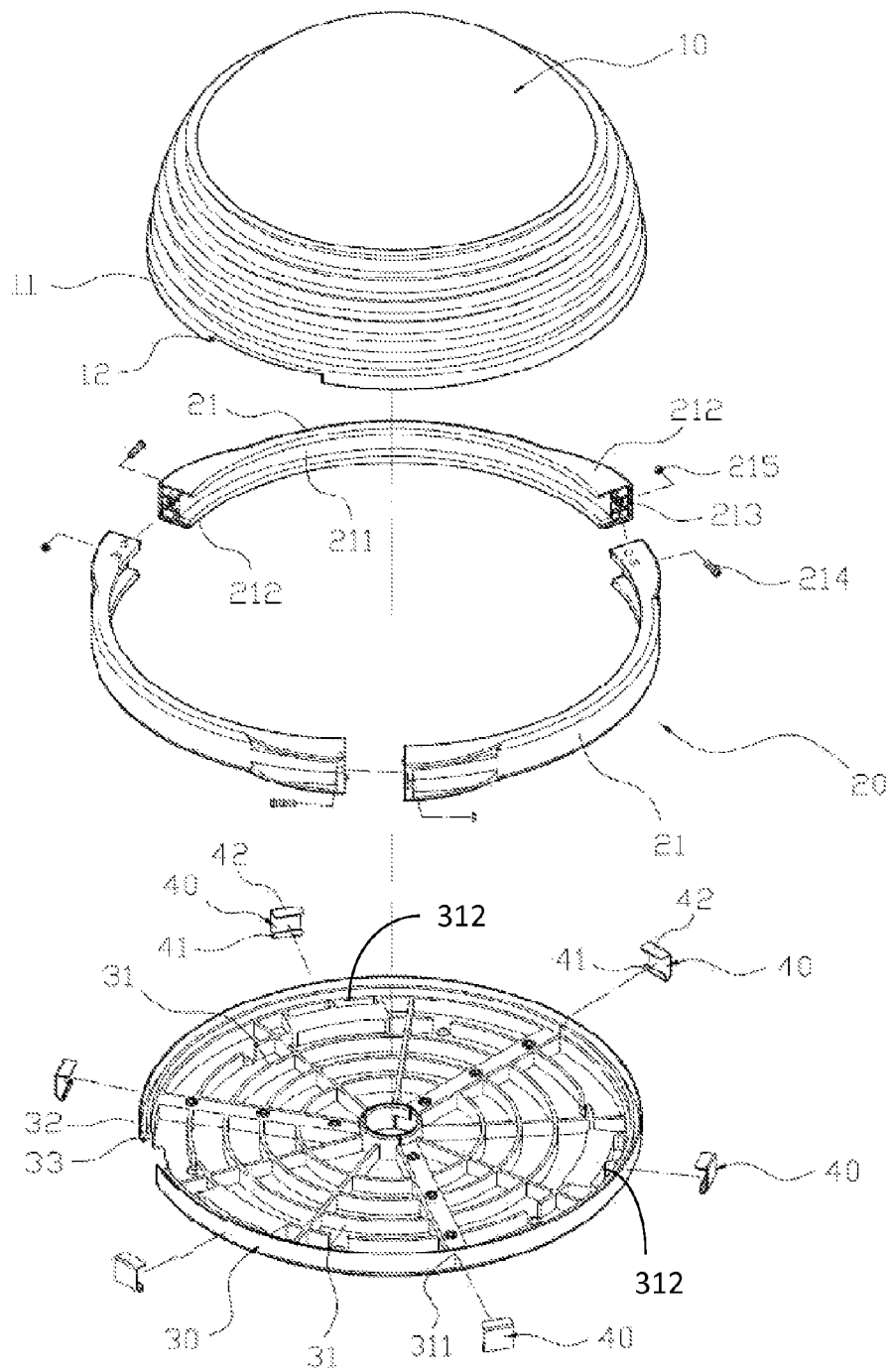
FIG. 2 illustrates a three-dimensional exploded view in the present invention.

In order to further understand the goal, characteristics and effect of the present invention, a number of embodiments along with the drawings are illustrated as following:

Referring to FIGS. 1 to 2, an improved structure to fix an inflatable and elastic motion body includes an elastic air bag (10), a frame (20), a base (30) and a plurality of restricting pieces (40). The elastic air bag (10) is a semicircular ball-shaped body, and a fixed edge (11) is protrudingly formed at a lower periphery of the elastic air bag (10), and a connecting edge (12) extends downwards from the fixed edge (11). Frame (20) includes a plurality of curved frames (21) that connect with each other to form a ring-shaped frame. A restricting slot (211) is recessedly formed at an inner portion of the curved frame (21) to provide a space for the fixed edge (11) of the elastic air bag (10). A connecting portion (212) extends from both sides of the restricting slot (211), and has a through hole (213) on each side. A locking unit (214) is provided for the through hole (213), and the through hole (213) for the other curved frame (21) provides a nut (215) engaging with the locking unit (214). The base (30) includes a plurality of fan-shaped boards (31), and a gap (311) is formed between each fan-shaped board (31). A receiving slot (32) is recessedly formed close to a top surface of the base (30), and the receiving slot (32) is provided for the connecting edge (12) of the elastic air bag (10). Also, a recessed engaging trough (33) is recessedly formed close to a bottom surface of the base (30). The restricting piece (40) is made by metal materials with better strength, and is spacedly disposed at an edge of the base (30) to evenly distribute the tension. The position to dispose the restricting piece (40) is corresponding to the gap (311) of the fan-shaped board (31) to further increase the structural strength of the base (30). A hook end (41) is bending and extending from one end of the restricting piece (40), and the hook end (41) engages in the recessed engaging trough (33) of the base (30). A pressing end (42) is bending and extending from the other end of the restricting piece (40), and a bending angle of the pressing end (42) is slightly smaller than 90 degrees to tightly clamp the fixed edge (11) of the elastic air bag (10). In a further embodiment, the base (30) includes a plurality of through apertures (312) spacedly formed on periphery of the base (30) to receive the restricting piece (40).

Figure 3:
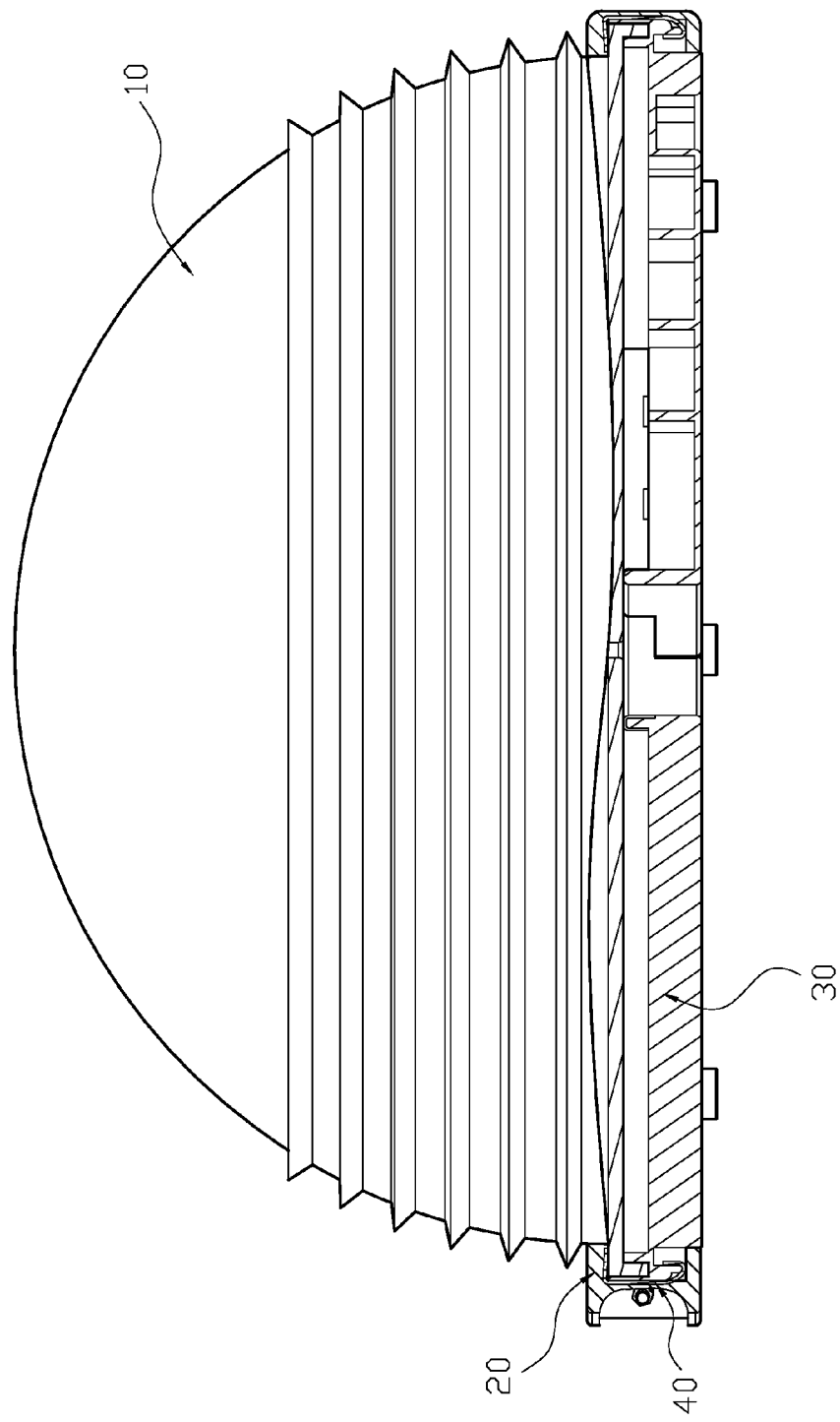
FIG. 3 illustrates a sectional schematic view in the present invention.
Figure 4:
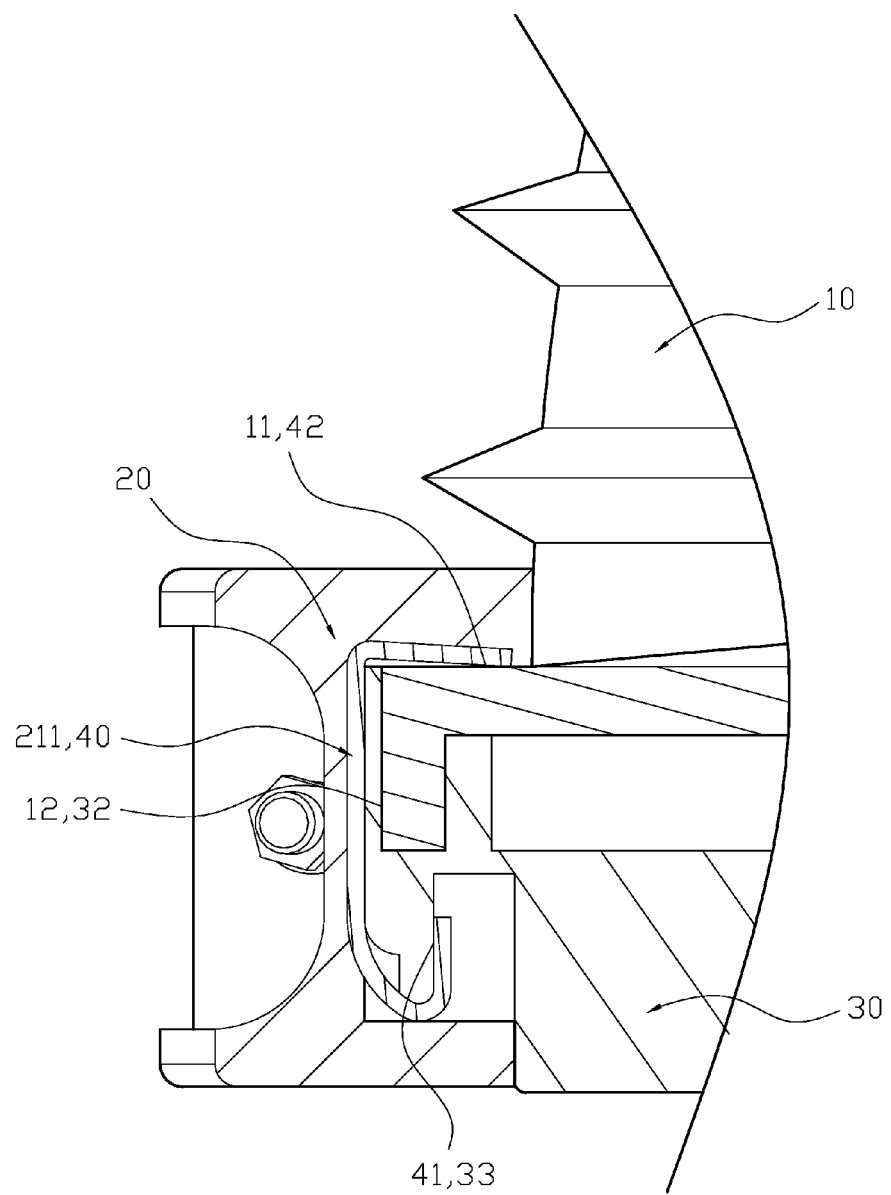
FIG. 4 illustrates a partial sectional view in the present invention.
Figure 5:
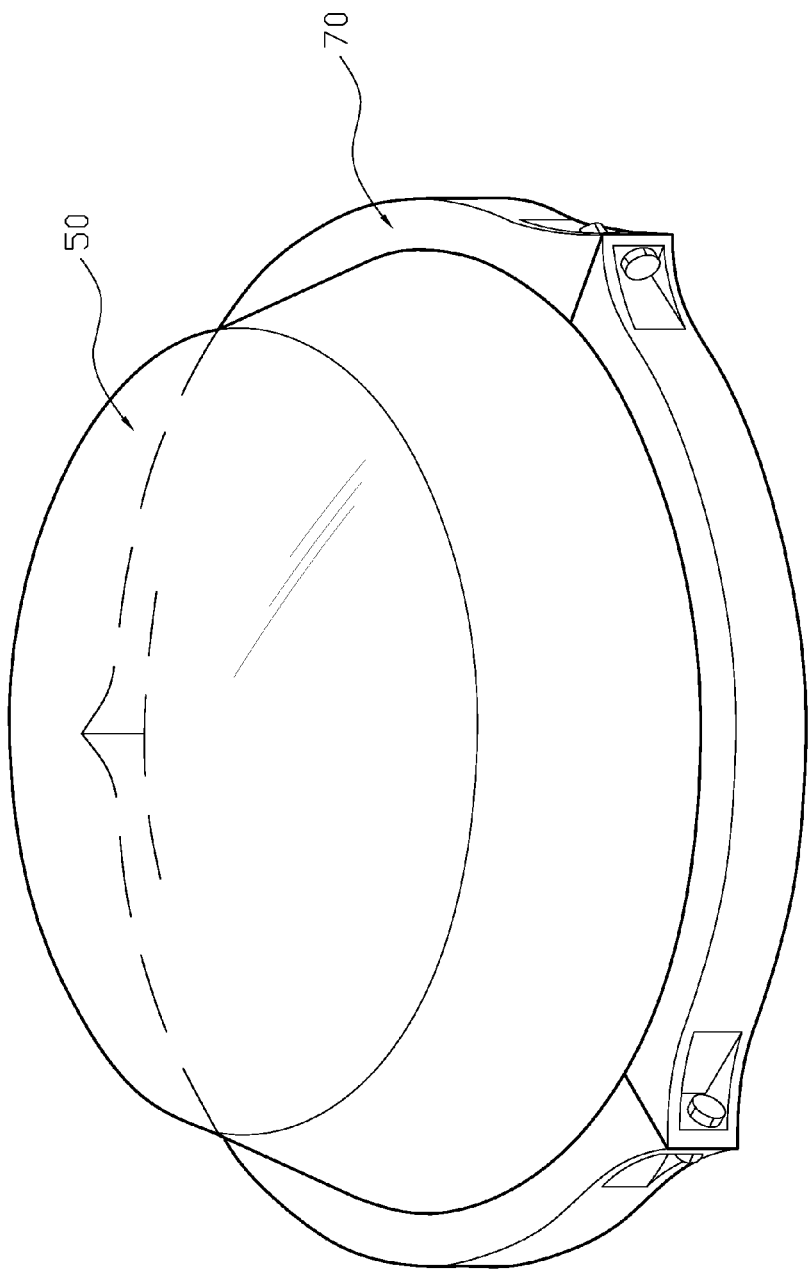
FIG. 5 illustrates a three-dimensional view of a prior art.
Figure 6:
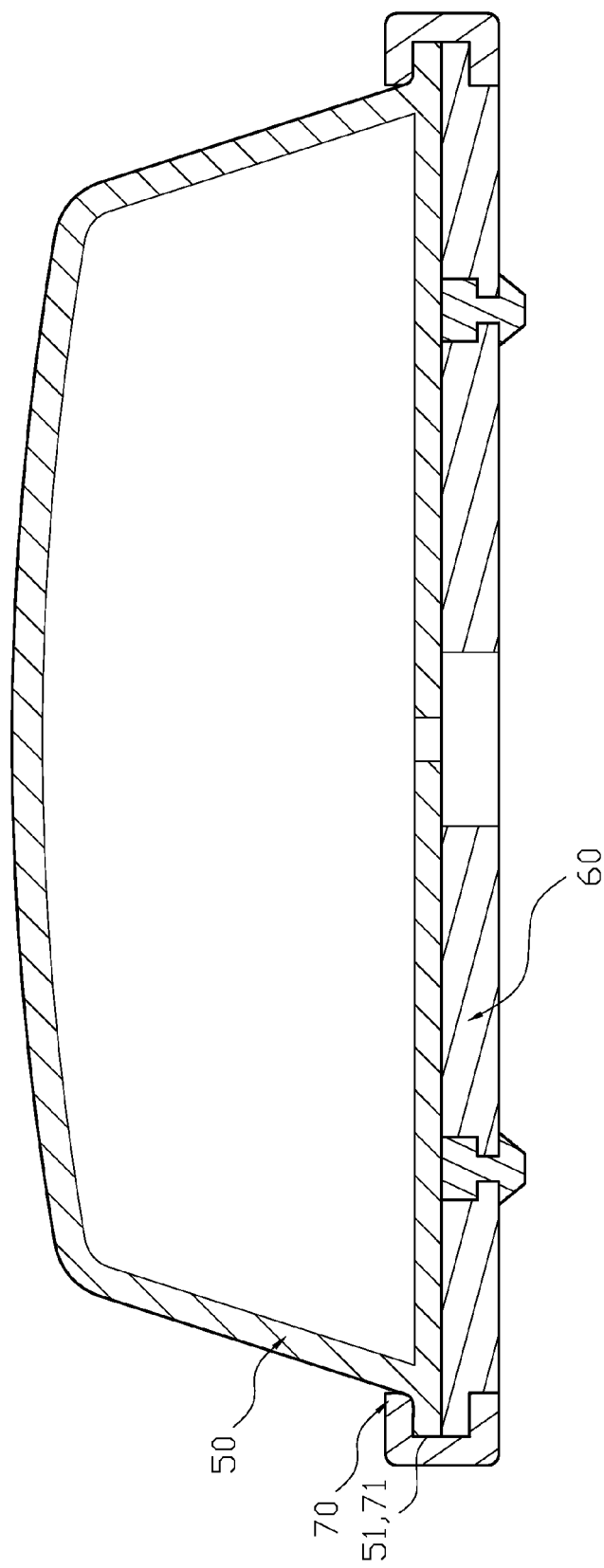
FIG. 6 illustrates a sectional schematic view of a prior art.

Referring to FIGS. 2 to 4 for the structure in the present invention, the connecting edge (12) of the elastic air bag (10) is disposed in the receiving slot (32) of the base (30), and the hook end (41) of the restricting piece (40) engages in the recessed engaging trough (33) of the base (30). The pressing end (42) of the restricting piece (40) is pressed against an upper portion of the fixed edge (11) of the elastic air bag (10), and the restricting slot (211) of the frame (20) is disposed at an outer periphery of the fixed edge (11) of the elastic air bag (10) and the base (30). The locking unit (214) passes through the through hole (213), and engages with the nut (215) of the other curved frame (21) to tighten the elastic air bag (10) and the base (30) to complete the assembly process. Since the restricting pieces (40) with better strength are disposed in the restricting slots (211) of the frame (20) to tightly clamp and confine the elastic air bag (10) and the base (30) to locate between the hook end (41) and the pressing end (42) of the restricting piece (40), so when the elastic air bag (10) is heavily pressed, it would not escape from the restricting slot (211) of the frame (20) to increase the structural strength and durability thereof.

According to the embodiments discussed above, the present invention is advantageous because (a) the restricting pieces (40) with better strength are disposed in the restricting slots (211) of the frame (20) to tightly clamp and confine the elastic air bag (10) and the base (30) to locate between the hook end (41) and the pressing end (42) of the restricting piece (40), so when the elastic air bag (10) is heavily pressed, it would not escape from the restricting slot (211) of the frame (20) to increase the structural strength and durability thereof; and (b) the restricting pieces (40) are positioned corresponding to the gaps (311) between each fan-shaped board (31), so the structural strength of the fan-shaped board (31) and the base (30) is enhanced.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An inflatable exercise device for promoting balance, comprising:

an elastic air bag comprising a semispherical ball-shaped inflatable elastic body having a lower circumferential edge fixed to a flat rigid plate, the rigid plate having a fixed edge radially protruding from and concentric with the lower circumferential edge of the elastic air bag, and an annular flange extending downwards from the fixed edge;

a disk-shaped base having a plurality of radially extending fan-shaped boards disposed on a top surface of the base, an annular receiving slot recessed within the top surface of the base adjacent to a peripheral edge thereof, and an annular engaging trough recessed within a bottom surface of the base adjacent to the peripheral edge thereof, wherein the annular flange of the rigid plate is received within the receiving slot of the base;

a plurality of restricting pieces made of resilient metal, and spacedly disposed around the peripheral edge of the base, each restricting piece having a flat central portion engaging the peripheral edge of the base, a hook end portion extending from a lower end of the restricting piece and inwardly bent toward the central portion, and a pressing end portion extending from an upper end of the restricting piece and inwardly bent toward the central portion;

wherein the hook end portion of each restricting piece is received within the engaging trough of the base, and the pressing end portion of each restricting piece engages an upper surface of the rigid plate when the annular flange of the rigid plate is received within the receiving slot of the base; and a ring-shaped frame having opposing upper and lower flanges defining an annular restricting slot formed at an inner portion thereof for receiving the rigid plate and the peripheral edge of the base when the annular flange of the rigid plate is received within the receiving slot of the base, the frame comprising a plurality of curved frame segments, each frame segment having opposing ends with a connecting portion having a circumferentially extending through hole extending from each end of the frame segment;

wherein a threaded locking unit extends through adjacent through holes of each respective pair of adjacent frame segments, and a nut is provided to engage with each locking unit to clamp together the frame segments around the rigid plate and the peripheral edge of the base, such that the upper flange of the frame clamps the pressing end portion of each restricting piece against the upper surface of the rigid plate, and such that the lower flange of the frame clamps the hook end portion of each restricting piece within the engaging trough of the base.

2. The inflatable exercise device of claim 1, wherein a gap is formed between adjacent fan-shaped boards, and a respective one of the restricting pieces is disposed within each gap to strengthen structure of the base.

3. The inflatable exercise device of claim 1, wherein a bending angle of the pressing end portion is smaller than 90 degrees.

* * * * *